US006658712B2

(12) United States Patent
Herold

(10) Patent No.: US 6,658,712 B2
(45) Date of Patent: Dec. 9, 2003

(54) BELT LACER

(75) Inventor: Wolfgang Herold, Offenbach/Main (DE)

(73) Assignee: MATO Maschinen-und Metallwarenfabrik Curt Matthaei GmbH & Co. KG, Offenbach (DE)

( * ) Notice: Subject to any disclaimer, the term of this patent is extended or adjusted under 35 U.S.C. 154(b) by 0 days.

(21) Appl. No.: 10/107,978

(22) Filed: Mar. 27, 2002

(65) Prior Publication Data

US 2002/0139433 A1 Oct. 3, 2002

(30) Foreign Application Priority Data

Mar. 27, 2001 (EP) .............................. 01107582

(51) Int. Cl.⁷ ............................... B23P 19/00
(52) U.S. Cl. .................. 29/243.51; 140/93 D
(58) Field of Search ............... 140/84, 93 D; 29/243.51

(56) References Cited

U.S. PATENT DOCUMENTS

| 1,393,451 A | 10/1921 | Nicholson |
| 1,498,275 A | 6/1924 | Hartley |
| 1,550,788 A | 8/1925 | Diamond |
| 1,768,935 A | 7/1930 | Schnelle |
| 1,894,981 A | 1/1933 | Diamond |
| 2,058,767 A | 10/1936 | Briggs |
| 2,167,820 A | * 8/1939 | Ziller ............... 29/243.51 |
| 3,044,074 A | * 7/1962 | Tebb et al. ........ 29/243.51 |

FOREIGN PATENT DOCUMENTS

DE 3219767 A1 12/1983

* cited by examiner

*Primary Examiner*—Lowell A. Larson
(74) *Attorney, Agent, or Firm*—Price, Heneveld, Cooper, DeWitt & Litton

(57) ABSTRACT

A belt lacer for connectors of the type having a plurality of wire hooks arranged in a side-by-side relationship includes a base element, and a holding member supported on the base element, and configured to receive and retain therein the belt connectors. The belt lacer also includes a crimping jaw having a pair of crimping jaw members rotatably mounted on the base element for mutual rotational motion, and configured to abuttingly engage from opposite directions the belt connectors retained in the holding member. Means are provided for converging and diverging said crimping jaw members, and a mechanism positively couples the rotational motion of the crimping jaw members relative to the base member.

33 Claims, 4 Drawing Sheets

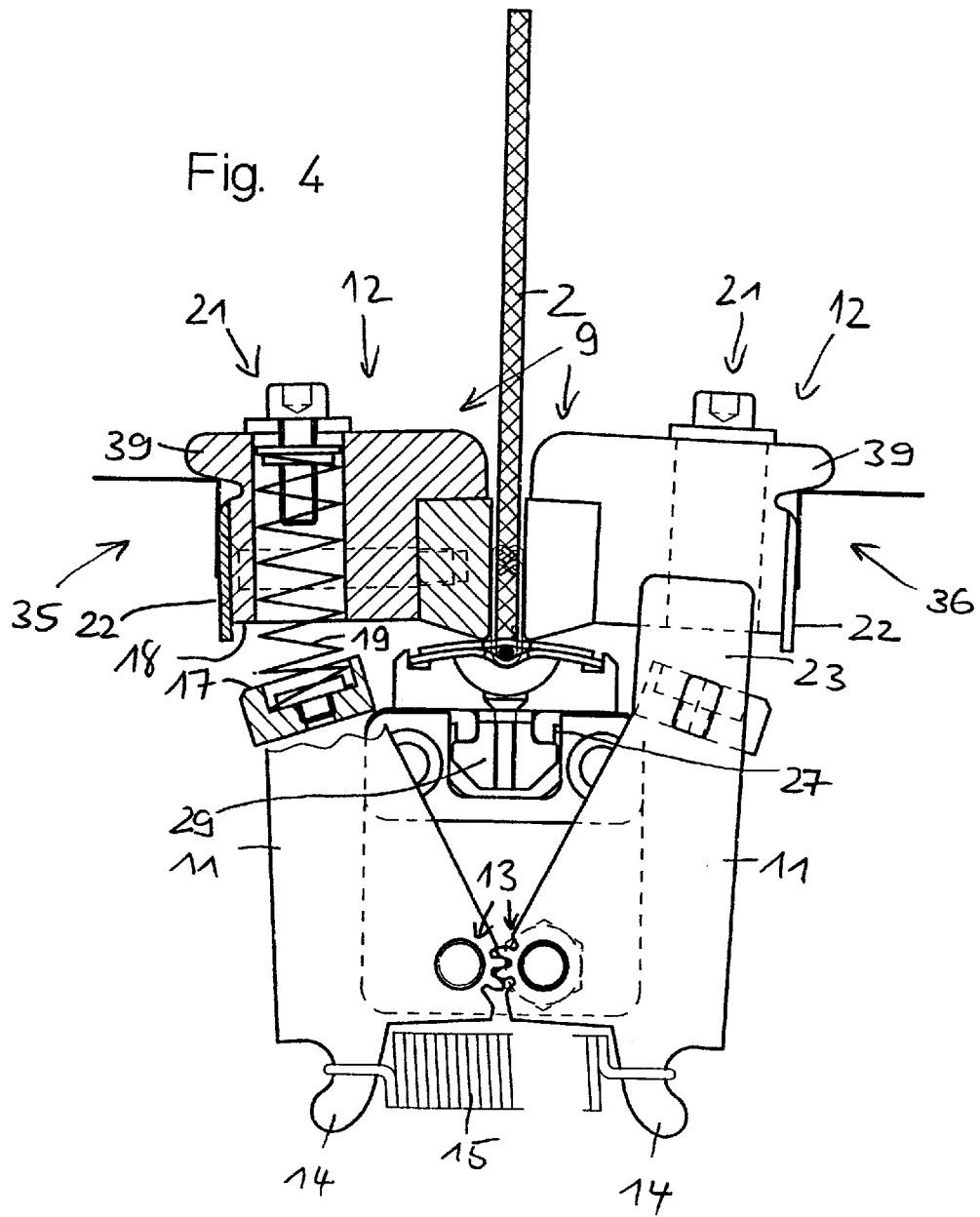

BELT LACER

BACKGROUND OF THE INVENTION

The present invention relates to lacers for conveyor belts, and the like, and in particular to a belt lacer for wire hook lacings.

In wire hook lacings of the type disclosed in U.S. Pat. Nos. 1,393,451; 1,894,981; 1,498,275 and 1,768,935, the end of a conveyor belt, or the like, is positioned between a strip of belt connectors, which are still in their open configuration. Movement of the legs of the connectors toward one another is caused by the action of crimping jaws abutting the legs of the belt connectors, such that the belt connectors penetrate the belt with their pointed free ends, and are pressed between the crimping jaws on the whole. A disadvantage of previous pressing instruments or lacers is that the force is not optimally directed to the belt connectors, in particular the wire hooks. The consequence is that the forward, rounded area of the belt connector or wire hook, through which a rod is slid for positioning the belt connectors in the holding apparatus, is not U-shaped, but rather is more O-shaped in form. This inadequate or improper shaping of the belt connectors during pressing also leads to increased vibrations when the belt is running, as well as to increased wear on the belt connection.

In general, prior belt lacers function in conjunction with vises. The crimping jaws of the belt lacer are moved toward one another by closing the moveable jaw of the vise. Using a vise and its crimping jaws to create the force for closing the crimping jaws of the crimping jaw pair leads to the transfer of compressive force from the one crimping jaw of the crimping jaw pair that comes in contact with the moveable jaw of the vise, via the belt connectors or wire hooks and the resident conveyor belt, onto the other crimping jaw of the crimping jaw pair which lies against the stationary jaw of the vise instrument. These kinetics are in part responsible for the inadequate insertion or installation of the belt connectors and/or wire hooks into an associated conveyor belt.

DE 32 19 767 C2 discloses a device of the type referenced above. It serves to press in wire hooks via the use of a vise instrument. The device has a holding apparatus with a comb-shaped receptacle for the wire hooks. The holding apparatus is traversed by a mounting bolt in which the crimping jaws of the crimping jaw pair are mounted via slotted holes. The crimping jaws are pre-tensioned or biased toward their open configuration via springs. While in this open configuration, the device is suspended between the open jaws of the vise instrument from above. Upon closing the vise instrument, by shifting a movable jaw of the vise instrument in the direction of a stationary jaw, the crimping jaws of the device move toward one another, and the free ends of the wire hooks penetrate into the conveyor belt. Shortly before the maximal compressive force is introduced to the conveyor belt via the jaws of the vise instrument, the crimping jaws of the device move away from one another in the area of their slotted mounting holes. In order to bring this about, the pressure faces of the jaws of the vise instrument are not planar in design, but are slightly angled or bent. Hence, no conventional vise with planar pressure faces can be used for pressing in belt connectors. If a belt, potentially one of different thickness, must be fitted with wire hooks having an alternate design, it becomes necessary to use another device with comb-like slits that have an alternative design for the wire hooks. Hence, an existing device cannot be adapted to accommodate the new application.

SUMMARY OF THE INVENTION

One object of the present invention is to provide an improved device or belt lacer of the above-named type wherein the closing forces are optimally directed onto the belt connectors or wire hooks arranged on both sides of the belt when pressing the belt connectors or wire hooks into an associated belt. Moreover, the device has an uncomplicated design and a simple motion sequence during connector compression.

Another object is to provide the device or belt lacer with means for mandatory coupling of the rotational motions of the crimping jaws relative to the base element. Consequently, the crimping jaws are not freely moveable relative to the base element. Rather, the rotational motion of the crimping jaws occurs in synchronization relative to the base element. As such, the device is not dependent on the mode of operation of the force generating means that closes the crimping jaws. Consequently, it is insignificant whether one jaw of the vise instrument is stationary, while the other jaw is moveable, when using a vise instrument, for example. The mandatory coupling of the rotational motions of the crimping jaws results in transfer of the closing forces into the belt connectors or wire hooks through both crimping jaws, not just one. Mandatory coupling can be brought about in a particularly simple manner if the crimping jaws have rim gear sections that mesh with one another. The construction of a design such as this is particularly easy to achieve if the two crimping jaws are rotatably mounted in the base element about different rotational axes.

In order to optimize the connector pressing process, value should be placed on a simple relative motion of the crimping jaws. More specifically, it is preferred that the mounting of the crimping jaws occurs not by way of an undefined guidance of the slotted holes of the crimping jaws on mounting pins of the base element, but rather by providing a mounting that allows only a rotational motion of the crimping jaws about predetermined or assigned mounting axes on the base element.

In particular, in order to ensure that the tips of the belt connectors or wire hooks are pressed into the conveyor belt with optimal force, the respective crimping jaw is preferably of a two part construction. In particular, it has a lower jaw element mounted in a pivotal or swivel fashion in the base element, and a compressive jaw element connected to the lower jaw element and moveable relative to it, whereby the force generating means acts upon the compressive jaw element. At the beginning of the closing motion of the crimping jaw pair, the lower jaw element and the compressive jaw element should be positioned against one another, so that a precise motion of the crimping jaw is ensured. Not until the final phase of the pressing process, when it is primarily a matter of transferring the high compressive forces via the force generating means which close the crimping jaws of the crimping jaw pair onto the crimping jaws and from there onto the belt connectors, is the contact between compressive jaw element and lower jaw element lifted, since it is, by that point, merely a matter of the effect of the respective compressive jaw elements. The main compressive force of the respective compressive jaw element acts upon the penetration point of the belt connector or wire hook.

The pressing process can certainly be achieved by means of a vise instrument in which the opposing pressure surfaces of the jaws are arranged exclusively parallel to one another. According to a further advantageous embodiment, the force generating means for closing the crimping jaws may be constructed as components of a hydraulic press.

The return of the crimping jaws to their open position is achieved by relieving the force generating means for closing the crimping jaws, preferably via spring tension. Springs are also advantageously provided to maintain contact between the compressive jaw element and the lower jaw element, in particular tension springs.

The holding apparatus for the belt connectors preferably has comb-like slits for the belt connectors corresponding to the arrangement of the belt connectors. The belt connectors are able to be positioned in the holding apparatus in a defined fashion as a result of this comb-like formation. As it relates to wire hooks, the device is suitable for both cross wire mounted, as well as paper mounted variants of wire hooks. A pin is provided for holding together in generally known fashion the belt connectors that have been placed in the holding apparatus.

According to a particular embodiment of the invention, it is foreseen that the holding apparatus for the belt connectors and the base element comprise separate design elements. If belt connectors with alternate designs or configurations are to be pressed into a belt, in particular a belt of another thickness, it is consequently not necessary to replace the device with another device featuring an alternate spacing of the holding apparatus or comb-like slits, but rather only the holding apparatus for the belt connectors must be exchanged. This can be accomplished in especially simple fashion if the base element has a receptacle for sliding in the holding apparatus. In particular, the holding apparatus is held in the base element in form fitting fashion. More specifically, the holding apparatus is preferably capable of being slid into and within the base element in a direction parallel to the rotational axes of the crimping jaw pair. It is expedient for the length of the holding apparatus to be 1.5 to 2 times that of the extension of the crimping jaw pair in the longitudinal direction of the holding apparatus. It is in this regard that the slidability feature of the holding apparatus is to be seen. This feature makes it possible to successively advance the holding apparatus or the comb, and hence to always close only some of the belt connectors or wire hooks precisely and under high pressure. If the holding apparatus were not slidable, the compressive force would be distributed across the entire breadth of the holding apparatus or the comb, and consequently across many of the belt connectors placed in the holding apparatus.

Further features of the invention are presented in the description of the figures and in the figures themselves, whereby it is noted that all individual features and all combinations of individual features are essential to the invention.

These and other advantages of the invention will be further understood and appreciated by those skilled in the art by reference to the following written specification, claims and appended drawings.

BRIEF DESCRIPTION OF THE DRAWINGS

The invention is presented in the figures on the basis of a preferred embodiment, without being limited to it. Represented are:

FIG. 4 is a frontal view similar to FIGS. 2 and 3 with fully closed crimping jaw pair.

DETAILED DESCRIPTION OF THE PREFERRED EMBODIMENTS

Figure 2:
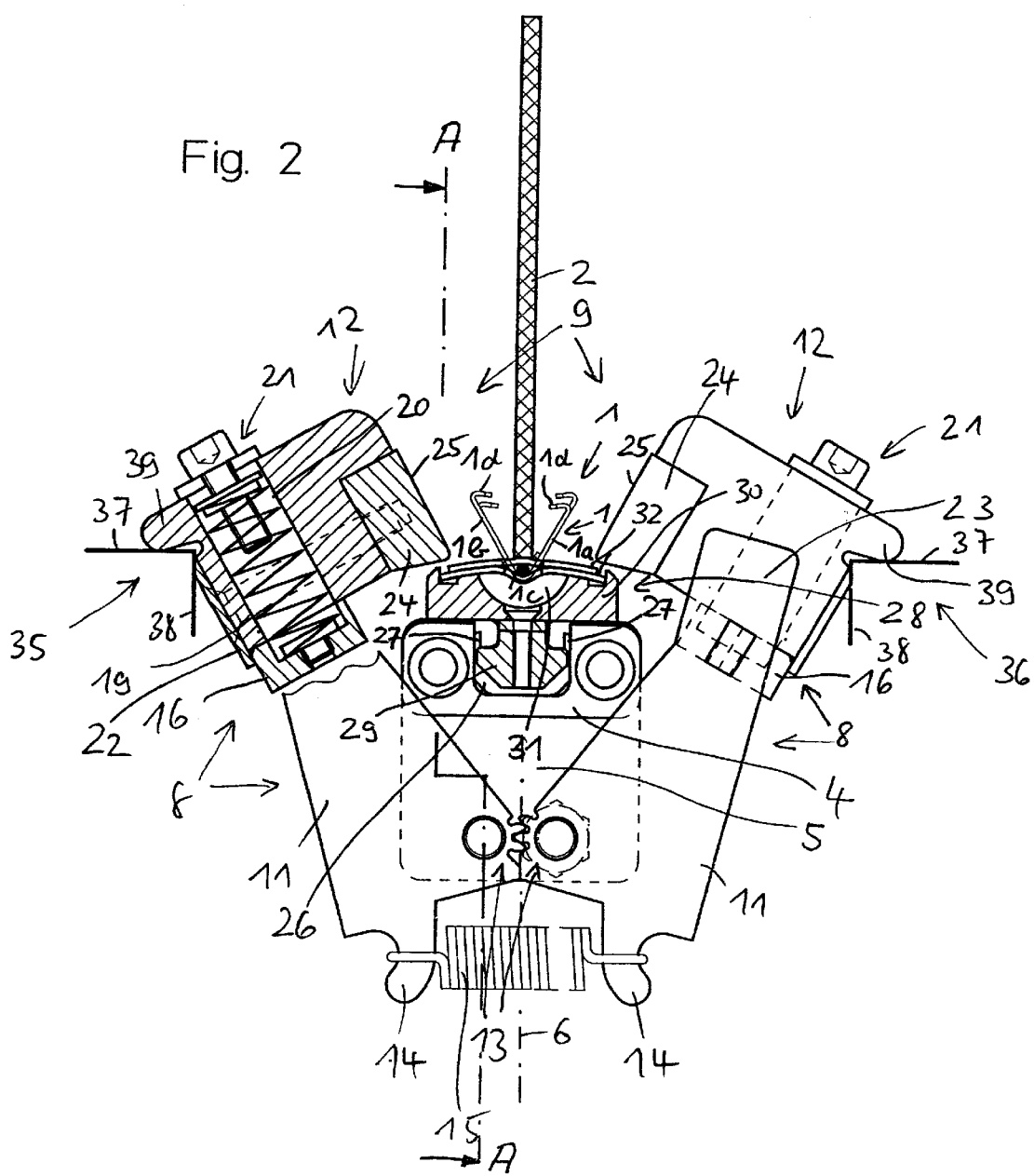
FIG. 2 is a frontal view of the device shown in FIG. 1 in partial sectional representation, with wire hooks placed in the holding apparatus and the belt end positioned in between them, shown with the crimping jaw pair in the completely open position.
Figure 3:
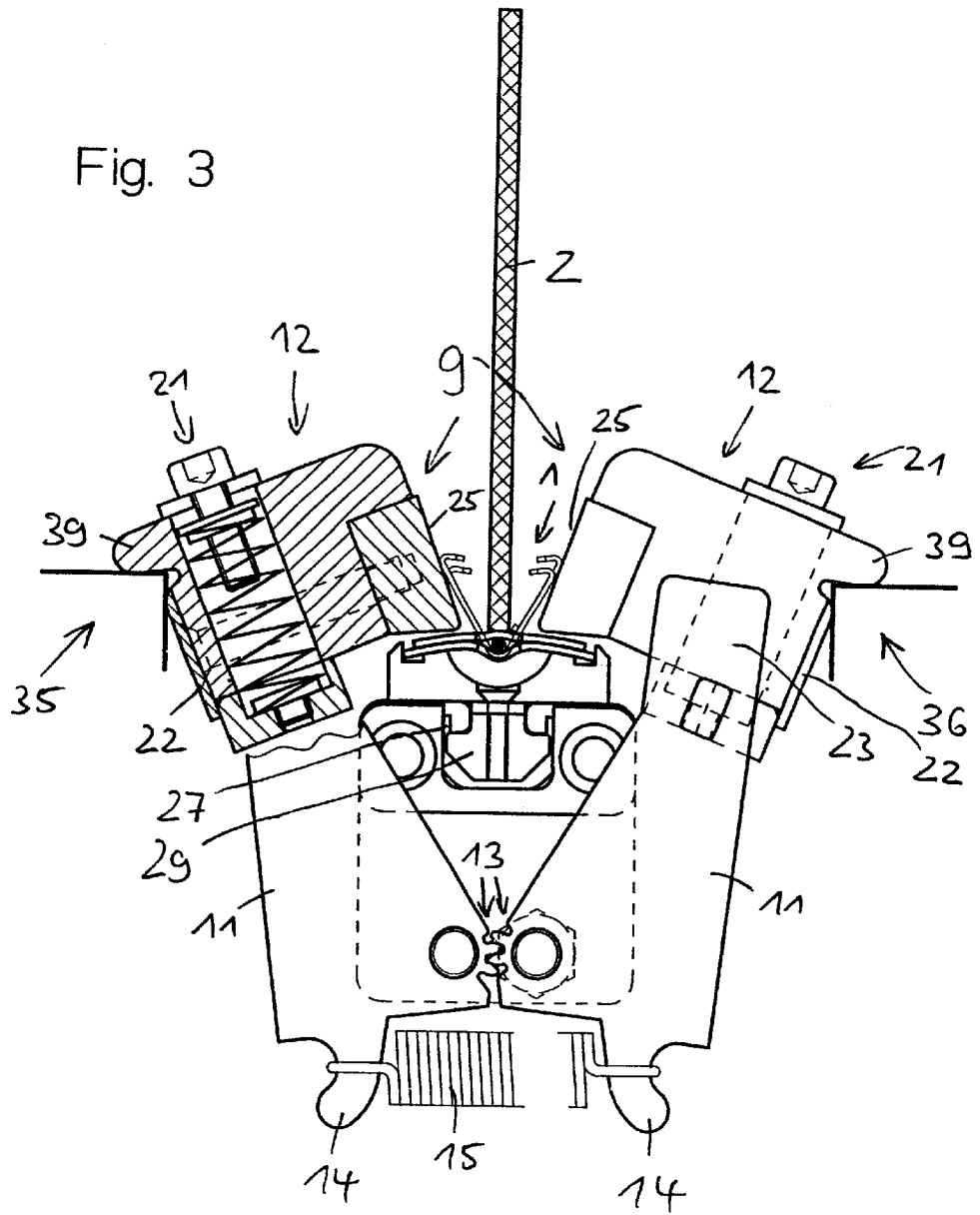
FIG. 3 is a frontal view similar to FIG. 2 with partially closed crimping jaw pair.

For purposes of description herein, the terms "upper", "lower", "right", "left", "rear", "front", "vertical", "horizontal" and derivatives thereof shall relate to the invention as oriented in FIGS. 2–4. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The device or belt lacer shown in the appended figures serves to press in wire hooks that are sufficiently known from the prior art, which hooks are mounted in a paper card, for example. The respective wire hook 1 has a relatively shorter leg 1a and a relatively longer leg 1b. The two legs 1a and 1b are connected to one another by means of a loop section 1c. Pointed hook projections 1d, that are directed toward one another, extend at an acute angle from the ends of the legs 1a and 1b that face away from the loop section 1c. A large number of wire hooks 1 are arranged behind one another relative to the view according to FIG. 2. Only two wire hooks 1 are visible in FIG. 2, since their short and long legs 1a, 1b alternate positions behind one another. A belt end of a conveyor belt 2 is positioned between the legs 1a and 1b of the wire hooks 1. The wire hooks 1 are to be pressed into the conveyor belt 2 in the area of the end of the conveyor belt by means of the device according to the present invention.

The device for pressing in the wire hooks 1 has a base element 3. It is composed of a longitudinally oriented receiving piece 4 and mounting plates 5 connected to the end faces of the former via screws 40. Each mounting plate 5 has two bores arranged symmetrically to the axis of symmetry 6 of the mounting plate 5. Mounting bolts 7 with terminal threads traverse these bores and bores in the crimping jaws 8 of the crimping jaw pair 9. Nuts 10 secure the mounting bolts 7. Each crimping jaw 8 is essentially composed of two flatly shaped lower jaw elements 11 and one compressive jaw element 12, which is connected to the former and extends in the longitudinal direction of the device, hence parallel to the receiving piece 4. In each case, the lower jaw elements 11 are rotatably mounted on the mounting bolts 7, and are positioned on that side of the respective mounting plate 5 that is directed away from the other mounting plate 5. The lower jaw elements 11 on each side of the device are provided with rim gear sections 13 in the area between the mounting bolts 7, whereby the teeth of the rim gear sections 13 on the lower jaw elements 11 on the respective sides mesh with one another. A defined rotational motion of a lower jaw element 11 relative to the mounting plate 5 consequently leads to a corresponding rotational motion of the other lower jaw element 11 relative to the mounting plate 5. A tension spring 15 hooks onto lower projections 14 of the adjacent lower jaw element 11 and thus biases the crimping jaw pair 9 toward its open position.

The two lower jaw elements 11 of the respective crimping jaw 8 are connected by a connecting element 16 arranged in parallel to the longitudinal extension of the receiving piece 4, which element has a planar contact surface 17 for contacting a contact face 18 of the compressive jaw element 12. The compressive jaw element 12 and the connecting element 16 are pressed against one another by means of multiple tension springs 19. These tension springs 19 traverse bores 20 in the compressive jaw element 12, and are held in the connecting element 16 and in locking screws 21 of the compressive jaw element 12. In order to ensure the lateral guidance of the respective compressive jaw element 12 relative to connecting element 16, the side of the compressive jaw element 12 facing away from the conveyor belt 2 exhibits a guide plate 22, which, upon approximation of the compressive jaw element 12 and the connecting element 16, overlaps the latter; furthermore, the lower jaw elements 11 of the respective crimping jaw 8 are extended far enough beyond the connecting element 16 that said elements guide the end faces of the compressive jaw element 12 between the extensions 23 in every operational position of the device.

The sides of the compressive jaw elements 12 facing one another are undercut to accommodate press inserts 24 that are provided with planar pressing surfaces 25. These pressing surfaces 25 contact or abut the wire hooks 1, whereby they are arranged in parallel to one another and to the conveyor belt 2 in their final position. The press inserts 24 are attached by a threaded connection, and can therefore be readily exchanged, particularly when they are worn.

On the side directed away from the mounting bolts 7, the receiving piece 4 is provided with a groove 26 that runs in the longitudinal direction of the receiving piece 4. Studs 27 that run in the longitudinal direction of the groove 26 project into it slightly, such that the groove 26 presents itself as an undercut groove. A holding apparatus 28 can be slid into the groove 26, which apparatus lies on top of the receiving piece, and which is provided with a lower, T-shaped projection 29, that traverses the groove 26 and grasps the studs 27 with a minimum amount of play.

Figure 1:
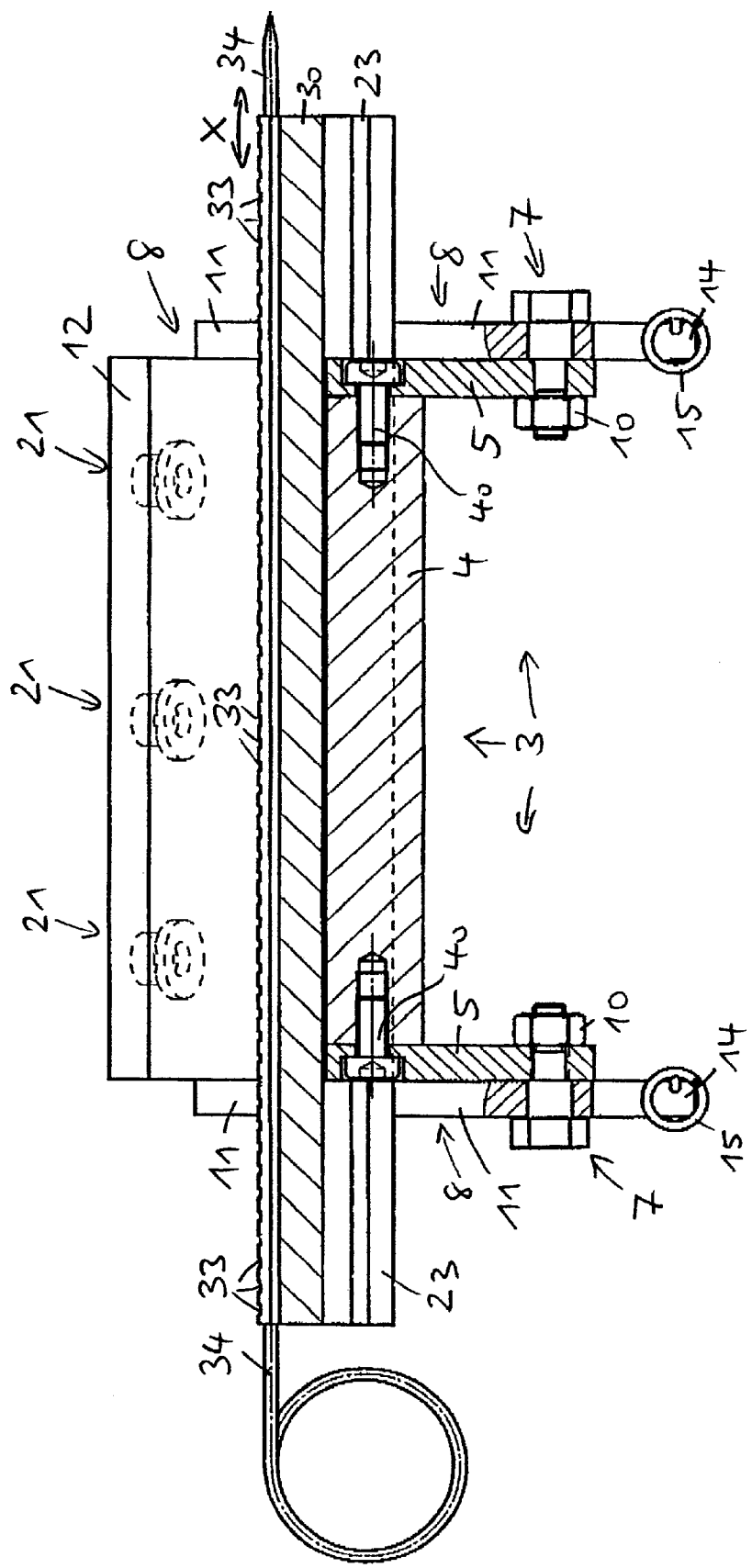
FIG. 1 is a section view through a device embodying the present invention, taken along line A—A of FIG. 2, illustrated however, without the belt connectors designed as wire hooks and without the conveyor belt.

The holding apparatus 28 is thus slidable relative to the receiving piece 4, in the directions of the double arrow X shown in FIG. 1. The holding apparatus 28 has a length that is 1.5 to 2 times as long as the extent of the receiving piece 4.

The top of the part 30 of the holding apparatus 28 that lies upon the receiving piece 4 is provided with a recess 31 which extends over the length of said apparatus, which recess is covered with a double walled covering 32. It is provided with comb-like openings corresponding to the distribution of the wire hooks 1, i.e., slits 33 oriented crosswise to the longitudinal extension of the holding apparatus 28, whereby each slit serves to accommodate a wire hook 1 in the area of its loop section 1c. The two walls of the covering 32 are bent slightly apart in this area, so that a pin 34 that forms one component of the holding apparatus 28 can be inserted from the side. This pin 34 extends over the entire length of the part 30 and is introduced between the upper wall of the covering 32 and the loop sections 1c of the wire hooks 1. A plurality of wire hooks 1 are fixed in the position in FIG. 2 by the introduction of the pin 34 in a manner which is essentially free of play. The conveyor belt 2 is placed between the legs 1a and 1b of the wire hooks 1, such that the lower end face of the belt comes to lie against the upper wall of the covering 32. In the starting configuration shown in FIG. 2, the wire hooks 1 and the conveyor belt 2 are positioned symmetrically to the axis of symmetry 6.

The agent or means of force for closing the crimping jaw 8 of the crimping jaw pair 9 is illustrated in FIGS. 2 and 4 based on the jaws 35 and 36 of an otherwise conventional vise instrument. The jaws 35 and 36 have a horizontal surface 37, and a vertical face 38 related to the pressing device. On its side associated with the jaws 35 and 36, the respective compressive jaw element 12 is provided with a protruding lug 39, which allows this area of the pressing device to be hung between the jaws 35 and 36 of the vise instrument, whereby the lugs 39 lie upon the upper surface 37 of the jaws 35 and 36. The vise instrument is operated manually, whereby jaw 35 is stationary, for example, and upon closing the vise, jaw 36 moves toward jaw 35.

FIG. 3 shows the situation when the jaws 35 and 36 of the vise instrument have moved closer to one another. The two crimping jaws 8 have moved closer to one another, whereby the mandatory coupled motion of the crimping jaws 8 takes place on the basis of the gearing in the area of the rim gear sections 13. At this stage, the tension springs 19 hold the compressive jaw elements 12 and the lower jaw elements 11 together. As the jaws 35 and 36 of the vise instrument continue to move closer to one another, the concrete or positive contact of the lower jaw elements 11 and the compressive jaw elements 12 is lifted in consideration of the effective springing forces of the tension springs 19 and the tension springs 15. Irrespective of the further rotational movements of the lower jaw elements 11 toward one another, the compressive jaw elements 12 swivel relative to the lower jaw elements 11, so that the compressive jaw elements 12 with their guide plates 22 lie flat against the lateral faces 38 of the jaws 35 and 36. This swiveling process of the compressive jaw elements 12 essentially takes place with the bending of the legs 1a and 1b of the wire hooks 1 toward the conveyor belt 2. The final pressing together of the wire hook 1 with the conveyor belt 2 occurs upon contact of the legs 1a and 1b of the wire hooks 1 onto the conveyor belt 2 under the influence of compressive forces directed perpendicular to the conveyor belt 2. This condition is illustrated in FIG. 4. Upon opening the jaws 35 and 36 of the vise instrument, the tension springs 19 pull the compressive jaw elements 12 back against the lower jaw elements 11.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. An apparatus for pressing into belt ends belt connectors of the type having a plurality of wire hooks arranged in a side-by-side relationship, comprising:

a base element;

a holding member supported on said base element, and configured to receive and retain therein the belt connectors;

a crimping jaw having a pair of crimping jaw members rotatably mounted on said base element for mutual rotational motion, and configured to abuttingly engage from opposite directions the belt connectors retained in said holding member;

means for converging and diverging said crimping jaw members; and rim gear sections disposed on said crimping jaw members which mesh together for positively coupling the rotational motion of said crimping jaw members relative to said base element.

2. An apparatus as set forth in claim 1, wherein:
said crimping jaw members are rotatably mounted on said base element along different rotational axes.

3. An apparatus as set forth in claim 2, wherein:
each of said crimping jaw members includes a lower jaw element mounted in swivel fashion on said base element, and a compressive jaw element connected to said lower jaw element and movable relative to it, whereby said converging and diverging means acts upon said compressive jaw element.

4. An apparatus as set forth in claim 3, wherein:
said compressive jaw element can be swiveled in the rotational plane of said lower jaw element.

5. An apparatus as set forth in claim 4, wherein:
said lower jaw element and said compressive jaw element are connected to one another by tension springs.

6. An apparatus as set forth in claim 5, wherein:
said lower jaw element and said compressive jaw element are guided relative to one another perpendicular to the rotational axes of said crimping jaw members.

7. An apparatus as set forth in claim 6, wherein:
said tension springs act upon said crimping jaw members in such a manner that said crimping jaw is pre-tensioned in an open configuration.

8. An apparatus as set forth in claim 7, wherein:
said holding member includes comb-like slits for receiving the belt connectors therein.

9. An apparatus as set forth in claim 8, wherein:
said holding member has a receptacle for receiving a pin for retaining the belt connectors in said holding member.

10. An apparatus as set forth in claim 9, wherein:
said holding member and said base element define separate components.

11. An apparatus as set forth in claim 10, wherein:
said base element has a receptacle for sliding said holding member into said base element.

12. An apparatus as set forth in claim 11, wherein:
said holding member can be slid into and within said base element in a direction parallel to the rotational axes of said crimping jaw members.

13. An apparatus as set forth in claim 12, wherein:
said holding member has a length that is 1.5 to 2 times as long as the length of said crimping jaw.

14. An apparatus as set forth in claim 13, wherein:
said base element has an undercut groove for reception of said holding member.

15. An apparatus as set forth in claim 14, wherein:
said base element is configured to accommodate various holding members to facilitate pressing different types of belt connectors.

16. An apparatus as set forth in claim 15, wherein:
said converging and diverging means comprises vise jaws.

17. An apparatus as set forth in claim 1, wherein:
said crimping jaw members are rotatably mounted on said base element along different rotational axes.

18. An apparatus as set forth in claim 1, wherein:
each of said crimping jaw members includes a lower jaw element mounted in swivel fashion on said base element, and a compressive jaw element connected to said lower jaw element and movable relative to it, whereby said converging and diverging means acts upon said compressive jaw element.

19. An apparatus as set forth in claim 18, wherein:
said compressive jaw element can be swiveled in the rotational plane of said lower jaw element.

20. An apparatus as set forth in claim 18, wherein:
said lower jaw element and said compressive jaw element are connected to one another by tension springs.

21. An apparatus as set forth in claim 20, wherein:
said tension springs act upon said crimping jaw members in such a manner that said crimping jaw is pre-tensioned in an open configuration.

22. An apparatus as set forth in claim 18, wherein:
said lower jaw element and said compressive jaw element are guided relative to one another perpendicular to the rotational axes of said crimping jaw members.

23. An apparatus as set forth in claim 1, wherein:
said holding member includes comb-like slits for receiving the belt connectors therein.

24. An apparatus as set forth in claim 1, wherein:
said holding member has a receptacle for receiving a pin for retaining the belt connectors in said holding member.

25. An apparatus as set forth in claim 1, wherein:
said holding member and said base element define separate components.

26. An apparatus as set forth in claim 1, wherein:
said base element has a receptacle for sliding said holding member into said base element.

27. An apparatus as set forth in claim 1, wherein:
said holding member can be slid into and within said base element in a direction parallel to the rotational axes of said crimping jaw members.

28. An apparatus as set forth in claim 1, wherein:
said holding member has a length that is 1.5 to 2 times as long as the length of said crimping jaw.

29. An apparatus as set forth in claim 1, wherein:
said base element has an undercut groove for reception of said holding member.

30. An apparatus as set forth in claim 1, wherein:
said base element is configured to accommodate various holding members to facilitate pressing different types of belt connectors.

31. An apparatus as set forth in claim 1, wherein:
said converging and diverging means comprises vise jaws.

32. An apparatus for pressing into belt ends belt connectors of the type having a plurality of wire hooks arranged in a side-by-side relationship, comprising:

a base element;

a holding member supported on said base element, and configured to receive and retain therein the belt connectors;

a crimping jaw having a pair of crimping jaw members rotatably mounted on said base element for mutual rotational motion, and configured to abuttingly engage from opposite directions the belt connectors retained in said holding member;

means for converging and diverging said crimping jaw members;

means for positively coupling the rotational motion of said crimping jaw members relative to said base element; and wherein each of said crimping jaw members includes a lower jaw element mounted in swivel fashion on said base element, and a compressive jaw element connected to said lower jaw element and movable relative to it, whereby said converging and diverging means acts upon said compressive jaw element; and said lower jaw element and said compressive jaw element are connected to one another by tension springs.

33. An apparatus as set forth in claim 33, wherein:

said tension springs act upon said crimping jaw members in such a manner that said crimping jaw is pretensioned in an open configuration.

* * * * *